Dec. 5, 1950          D. L. HINGS          2,532,667

HIGH-SPEED PULSE RECEPTION SYSTEM

Filed Aug. 6, 1945          2 Sheets-Sheet 1

INVENTOR
Donald L. Hings
BY Shoodling and Krost
ATTORNEYS.

Dec. 5, 1950 D. L. HINGS 2,532,667
HIGH-SPEED PULSE RECEPTION SYSTEM
Filed Aug. 6, 1945 2 Sheets-Sheet 2
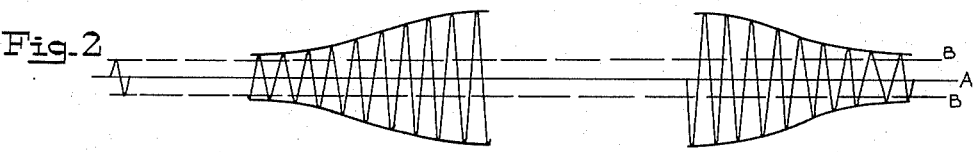
Fig.2
Fig.3
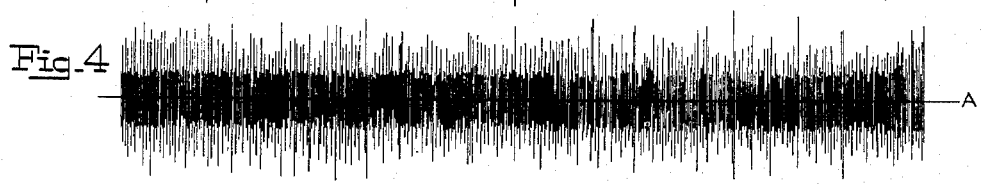
Fig.4
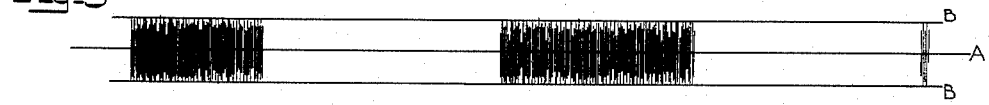
Fig.5
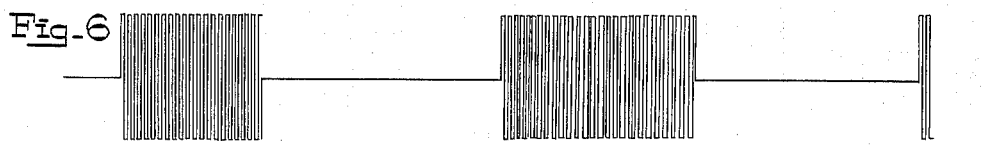
Fig.6
Fig.7
Fig.8
Fig.9
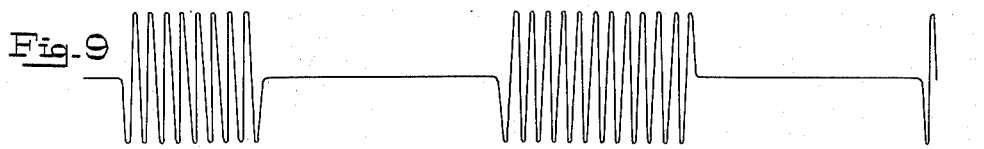
Fig.10
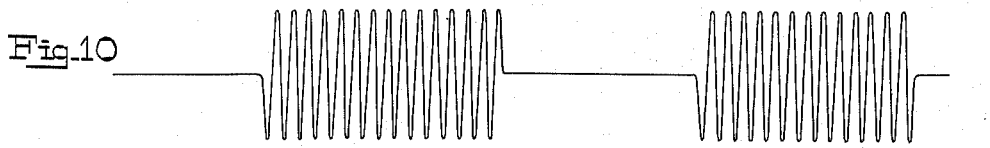
INVENTOR
Donald L. Hings
BY Stoodling and Kroot
ATTORNEYS.

Patented Dec. 5, 1950

2,532,667

UNITED STATES PATENT OFFICE 2,532,667

HIGH-SPEED PULSE RECEPTION SYSTEM

Donald L. Hings, Ottawa, Ontario, Canada, assignor, by mesne assignments, to Cornell-Dubilier Electric Corporation, South Plainfield, N. J., a corporation of Delaware Application August 6, 1945, Serial No. 609,261 In Canada July 20, 1945

3 Claims. (Cl. 250—20)

This application constitutes an improvement in my application Serial No. 609,260, filed the sixth day of August, 1945, for Pulse Reception System and executed concurrently herewith.

My invention relates to a pulse reception system and more particularly to a pulse reception system having both pulsed continuous waves and interference waves between which discrimination is made for the purpose of establishing a control circuit to govern a current responsive device, and which gives a linear response at high frequencies of the interference waves.

An object of my invention is the provision in a pulse reception system which avoids the requirement of rectifying the energies in order that they might be thereafter limited in their amplitude.

Another object of my invention is the provision of limiting the value of the amplitude of the interference energies by means of a square wave amplifier.

Another object of my invention is to provide for giving relatively large direct current output whereby the output may be coupled to operate directly a current responsive device.

Another object of my invention is the provision in a pulse reception system which avoids the use of inductive components.

Another object of my invention is the provision of a reception system having both pulsed continuous waves and interference waves, together with means during the spacer intervals for utilizing the energy from the interference waves and for neutralizing both the pulsed continuous waves and the interference waves during the marker intervals.

Another object of my invention is the provision in a pulse reception system of injecting generated interference waves over and above the inherent spurious interference waves, whereby an increased amount of energy is available during the spacer intervals for utilization as a means of control to govern a current responsive device which generates a secondary pulsed continuous wave which has substantially the same time constants as the primary pulsed continuous waves.

Another object of my invention is the provision in a pulse reception system of means for injecting energy into the system which is available for control purposes during the spacer intervals of the pulsed continuous wave.

Another object of my invention is the provision in a pulse reception system which short circuits the pulsed continuous waves during the marker intervals and which provides a source of control energy during the spacer intervals.

Another object of my invention is to inject, into a pulse reception system, interference energies having a larger magnitude than that of the spurious interference energies.

Other objects and a fuller understanding of my invention may be had from the following description and claims, taken in conjunction with the accompanying drawings, in which:

Figure 2 is a view of a pulsed continuous wave which is shown as being free of all interference waves and is shown as having a fading amplitude component.

Figure 3 is a view of a spurious interference wave which is present in normal atmospheric reception.

Figure 4 shows a view of a discharge interference wave, having a random peaked envelope, which may be injected into my pulse reception system.

Figure 5 shows a view of the combination energy wave comprising both the spurious interference energies and the injected interference energies, with the amplitude of the energies limited and being discontinuous through the marker period.

Figure 6 is a view of an amplifier square wave produced from the energy wave of Figure 5.

Figure 7 is a view of the amplitude wave in Figure 6, after the frequency of the wave in Figure 6 has been doubled and the amplitude of the energies limited to a predetermined level.

Figure 8 is a view representing an energy wave produced by filtering the wave of Figure 7.

Figure 9 is a pulsed continuous wave generated by a secondary source and governed by a current responsive device in response to the energies obtained during the spacer intervals from the interference waves.

Figure 10 shows a modified pulsed continuous wave, generated from the secondary source and having an inverse time constant with respect to Figure 9, but of the same time constant as Figure 2 which shows the primary pulsed continuous wave.

Figure 1:
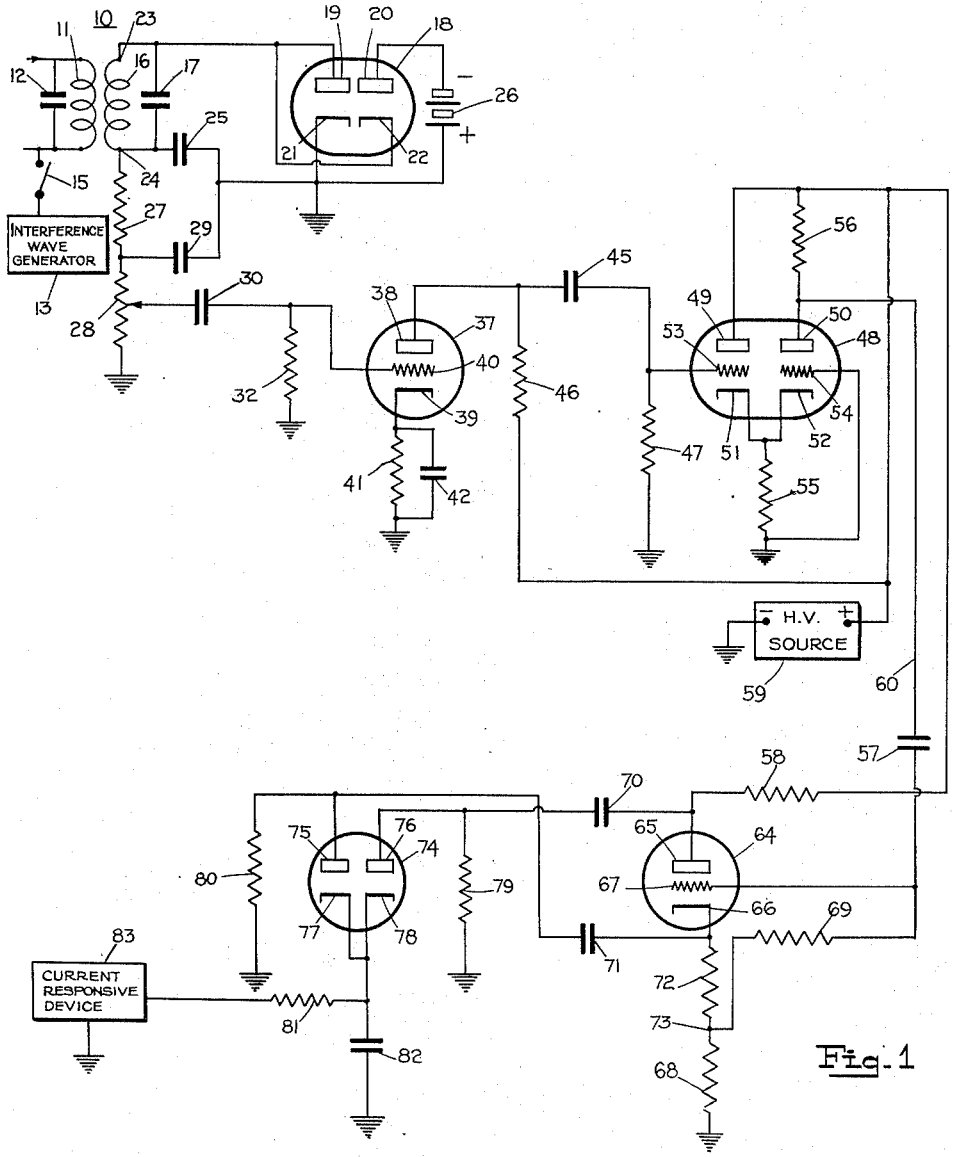
Figure 1 represents a diagrammatic view of a pulse reception system embodying the features of my invention.

With reference to Figure 1 of the drawing, the reference character 10 represents a transformer having a primary winding 11 adapted to receive pulsed continuous waves which may come from pulsed transmissions of intelligence such, for example, as a pulsed continuous wave employed in the operation of a teleprinter or other device. A condenser 12 is connected across the primary winding 11 and the two constitute a tuned circuit which may be tuned substantially to resonance at a frequency equal to the frequency of the incoming carrier waves.

My invention preferably provides for injecting interference waves into the transformer circuit, whereby the transformer delivers both pulsed continuous waves and injected interference waves. The injection of the interference waves into the pulsed continuous waves may be done by employing an interference wave generator 13, which may be connected to the transformer circuit by a switch 15. When the switch 15 is closed, the interference waves injected into the pulsed continuous wave system have a random discharge wave envelope, as shown in Figure 4. The construction and arrangement of the interference wave generator 13 may be substantially the same as that shown in my pending application, executed concurrently herewith, entitled Discharge Wave Generator, Serial No. 609,259, filed August 6, 1945, now Patent No. 2,468,754, granted May 3, 1949.

Figure 2 may represent a pure pulsed continuous wave which is excited in the transformer 10, without the presence of the spurious interference waves which exist in reception under normal atmospheric conditions. Figure 3 shows a representation of a spurious interference wave as may be found in reception. In actual operation, the incoming energy received from the pulsed continuous wave transmitter would be a combination of Figures 2 and 3. Figure 4 shows a representation of an interference wave as delevered by the interference wave generator 13.

In actual operation, the wave energies excited in the secondary winding 16 of the transformer would be a combination of the waves shown in Figures 2, 3 and 4. In my invention, the injected interference energies preferably have a larger magnitude than that of the spurious interference energies. A condenser 17 is connected across the secondary winding 16 and provides in combination therewith a tuned circuit which may be tuned substantially to resonance at a frequency substantially equal to the frequency of the incoming pulsed continuous waves. The energy delivered by the secondary winding 16 and the condenser 17 is detected and limited by a duo-diode rectifier 18 comprising two plates 19 and 20 and two cathodes 21 and 22. The plate 19 and the cathode 22 are connected to the upper terminal 23 of the secondary winding 16. The cathode 21 is connected to ground and to the lower terminal 24 of the secondary winding 16 through a high-frequency by-pass condenser 25.

A battery 26 is connected between the plate 20 and the cathode 21. The plate 19 and the cathode 21 constitute a part of the detector circuit which comprises the resonant circuit 16 and 17 and the fixed resistor 27 and the adjustable resistor 28. The fixed resistor 27 in combination with the condensers 25 and 29 constitutes a high-frequency filter and the adjustable resistor 28 constitutes a detector load resistance.

In actual operation, the plate 19 and the cathode 21 pass current from the secondary winding 16 until the voltage of the detector circuit reaches a value equal to the voltage of the battery 26, at which point the energy from the secondary winding 16 is conducted to ground through a circuit including the cathode 22, the plate 20 and the battery 26. In my invention, the potential of the battery 26 and the design of the detector circuit is such that the voltage generated in the detector circuit resulting from a detection of the pulsed continuous wave is always greater than the voltage of the battery 26, whereby during the marker intervals the energy of the secondary winding 16 of the transformer below the effective battery bias is conducted to the load resistor 28 and the energy which is above the effective battery bias is neutralized. Thus, under the above condition, the pulsed continuous waves during the marker intervals, as well as the spurious interference waves and the injected interference waves, are suppressed and prevented from flowing in the detector circuit. This condition is similar to that shown in Figure 5 which shows the voltage across the tuned circuit 16—17. However, the design of the detector circuit and the voltage of the battery 26 is such that a major portion of the energies from the spurious interference waves and the injected interference waves is permitted to flow in the detector circuit such as would be shown in Figure 5 were the lower half of the wave removed, the high peaked random amplitudes being cut off. In other words, the detector circuit is such as to limit the amplitude of the detection of the spurious interference waves and the injected interference waves. The random peaked amplitudes of the spurious peaks in my invention may be many times greater than the amplitude of the pulsed continuous waves, but they are limited by the action of the duo-diode rectifier 18. The same is true with respect to the amplitudes of the injected interference waves. Even though the amplitudes of the spurious interference waves and the injected interference waves are limited to a predetermined value, yet there are a multitude of tiny spaces therebetween, which envelope may be detected below the level of the predetermined value to which they are limited. To further explain the operation of this part of my circuit, I offer the following theory, but do not intend to be bound by the consequences of any theory: During the spacer intervals, since the envelope of the interference wave will periodically, at an audio frequency rate, drop to zero or to a magnitude less than that of the predetermined level of the battery bias, neutralization will not occur at these periods, and therefore an audio frequency voltage will appear across the load resistor 28, to be passed to the next stage. Now during the marker intervals, the voltage of the incoming signal, that is, the pulsed continuous wave, being a continuous wave that has an envelope always greater in magnitude than the effective battery bias, dominates the tuned circuit 16—17 to cause the positive half cycles passed by the diode elements 19 and 21 to fully occupy the diode rectifying cycle. Therefore, the filtering action of the high frequency filter 25, 29 and 27 smooths out the high frequency half cycles to effectively produce a direct current component across the load resistor 28, as governed by the effective battery bias. The rectification of the negative half cycles in excess of the battery bias neutralizes that portion of the positive half cycles in excess of the battery potential in the filter 25—27—29, thereby leaving only the direct current voltage from the diode 19—21 at a potential substantially proportional to the effective battery bias across the load resistor 28. This neutralization of the high frequency cycles means that all alternating potentials are neutralized and therefore no envelope exists. Thus neutralization of the high frequency cycles may also be considered as neutralization of the envelope, which means that no signal is passed to the next stage during the marker interval.

The next process in my pulse reception system is to amplify the detected energy waves, and, as illustrated, I provide an amplifier 37 for this purpose. The amplifier 37 may comprise a plate 38, a cathode 39 and a grid 40. With the switch 15 closed, which is the condition when interference waves are injected into the system, the detected energy from resistor 28 of the detector circuit is coupled directly to the grid 40 of the amplifier tube 47 by a condenser 30. The resistor 32 is the grid resistor for the grid 40 and the resistor 41 is the cathode biasing resistor for the cathode 39. The condenser 42 is a by-pass for the cathode 39 to ground. The wave which appears in the cathode plate circuit of the amplifier 37 may be represented as similar to the envelope of the wave of Figure 5, although in actual practice the amplitude may be relatively greater than that shown in Figure 5. The plate 38 of the amplifier 37 is connected to the positive side of the high voltage source 59 through a plate load resistor 46. The amplifier output from the plate 38 of the amplifier tube 37 is coupled through a coupling condenser 45 to a square wave amplifier tube 48 which comprises two plates 49 and 50, two cathodes 51 and 52 and two grids 53 and 54. The grid 53 is connected to the condenser 45 and to ground through the resistor 47. The cathodes 51 and 52 are joined together and both are connected to ground through a cathode biasing resistor 55. The plate 49 is directly connected to the high voltage source 59. The plate 50 is connected to the high voltage source 59 through a plate load resistor 56. The output of the square wave amplifier tube 48 appears between the plate 50 and ground, which is shown in the Figure 6. The cathode 51 is positive with respect to ground and, inasmuch as the grid is connected to ground, it is more negative than the cathode 51.

In operation of the tube 48, when there is no wave excitation from the interference energies applied to the grid 53, both the cathode-to-plate circuits of the tube pass substantially the same amount of direct current. When the grid 53 is excited by the positive cycle of the incoming interference waves, the excitation on the grid 53 causes more current to flow from the cathode 51 and the plate 49 and thus the cathode 51 and the plate 49 function as an amplifier. The increased flow of the current through the cathode 51 and the plate 49 causes the cathode 51 to swing more positive and causes the current which is flowing between the cathode 52 and the plate 50 to be cut off at a predetermined value due to the increased bias of the cathode 52 with respect to the grid 54 and thereby produces a square wave having a predetermined amplitude. As the grid 53 is excited with energies from the negative cycle of the incoming interference energies, then the current which flows between the cathode 51 and the plate 49 is cut off at a predetermined value and, when this cut-off situation is effected between the cathode 51 and the plate 49, the cathode 52 becomes inoperative, with the result that the current flow between the cathode 52 and the plate 50 is constant, which produces a square wave for the opposite cycle. Thus, the cathode 52 and the plate 50 in conjunction with the cathode 51 and the plate 49 operate as a square wave amplifier for delivering an alternating current square wave. The amplitude of the alternating current square wave is determined by the amplification factor of the tube. This square wave energy is delivered to an inverter tube 64 through a conductor 60 and a coupling condenser 57. The inverter tube 64 comprises a plate 65, a cathode 66 and a grid 67 which is connected to the condenser 57. The plate 65 is connected to the high voltage source 59 through a plate load resistor 58. The cathode 66 is connected to ground through a cathode biasing resistor 72 and a cathode load resistor 68. The grid 67 is connected to a point 73 intermediate the two resistors 68 and 72 through a grid resistor 69. The output from the inverter tube 64 is applied to the coupling condensers 70 and 71 and gives a push-pull output. The operation of the inverter tube 64 is such as to convert the energy delivered thereto into a full-wave source above ground through the push-pull output. The tube 64 may be characterized as having a push-pull output, whereby the output energy may be suitable for full-wave rectification. The output full-wave energy from the tube 64 is rectified by means of a rectifier tube 74 which comprises two plates 75 and 76 and two cathodes 77 and 78. The resistors 79 and 80 are plate isolating resistors for the plates 76 and 75 respectively. The full-wave rectified output from the rectifier tube 74 may be filtered by means of a resistor 81 and a condenser 82. The output is shown as being diagrammatically delivered to a current responsive device 83 which may be any suitable device for generating a secondary pulsed wave and functioning as a method of control for giving a secondary pulsed continuous wave which has substantially the inverse time constants as the primary pulsed continuous waves as shown by the secondary wave in Figure 9 or which has substantially the same time constants as shown in Figure 10.

The subjection of the energy waves as shown in Figure 6 upon the inverter tube 64 and the rectifier tube 74 produces in the output of the rectifier tube 74 energy waves such as shown in Figure 7. The resistor 81 and the condenser 82 filter the energy waves of Figure 7 and produce a relatively pure wave output as shown in Figure 8, which wave is applied to the current responsive device 83 for operating same.

It is noted in the arrangement of the circuit in Figure 1 that I employed no inductive device which slows up the speed of operation of my circuit. In fact, the various stages of the circuit are coupled by means of resistance coupling, which permits a truer response for higher-frequency interference waves.

Although I have shown and described my invention with a certain degree of particularity, it is understood that changes may be made therein without departing from the spirit of the invention which are included within the scope of the claims hereinafter set forth.

I claim as my invention:

1. In a pulsed continuous wave reception system having on and off periods producing alternate spacer and marker intervals, means for producing interference waves having a component of frequency lower than said continuous wave in the pulsed continuous wave reception system, detector means adapted to receive both continuous wave and interference energy and including means during the marker intervals for neutralizing the pulsed continuous waves and the interference waves and means during the spacer intervals for detecting and limiting the interference waves having a voltage exceeding a first predetermined value, means for amplifying the detected and limited interference waves, a square wave amplifier for amplifying and limiting the interference waves having a second voltage exceeding a predetermined value, inverter tube means having a push-pull output circuit for rendering the amplified and limited interference waves suitable for full-wave rectification, rectifier means for rectifying the interference energies, and current responsive means governed by the rectified interference energies.

2. In a pulsed continuous wave reception system having on and off periods producing alternate spacer and marker intervals, means for producing interference waves having a component of frequency lower than said continuous wave in the pulsed continuous wave reception system, means adapted to receive both continuous wave and interference energy during the spacer intervals for detecting the interference wave energies, a square wave amplifier for amplifying and limiting the detected interference energies, inverter tube means for inverting the amplified and limited square wave interference energies into voltages of opposite phases above ground, a full-wave rectifier tube for rectifying the two voltages, and current responsive means controlled by the rectified energies of the rectifier tube.

3. In a pulsed continuous wave reception system having on and off periods producing alternate spacer and marker intervals, means for producing interference waves having a component of frequency lower than said continuous wave in the pulsed continuous wave reception system, detector means adapted to receive both continuous wave and interference energy and including means during the marker intervals for neutralizing the pulsed continuous waves and the interference waves and means during the spacer intervals for detecting and limiting the interference waves having a voltage exceeding a predetermined value, a square wave amplifier for amplifying and limiting the interference waves having a voltage exceeding a predetermined value, inverter tube means having a push-pull output circuit for rendering the amplified and limited interference waves suitable for full-wave rectification, rectifier means for rectifying the interference energies, and current responsive means governed by the rectified interference energies.

DONALD L. HINGS.

REFERENCES CITED

The following references are of record in the file of this patent:

UNITED STATES PATENTS

| Number | Name | Date |
| --- | --- | --- |
| 1,723,440 | Ranger | Aug. 6, 1929 |
| 2,087,063 | McCutchen | July 13, 1937 |
| 2,276,565 | Crosby | Mar. 17, 1942 |
| 2,283,404 | Wood | May 19, 1942 |
| 2,343,115 | Noble | Feb. 29, 1944 |
| 2,356,224 | Crosby | Aug. 22, 1944 |
| 2,383,126 | Hollingsworth | Aug. 21, 1945 |
| 2,410,843 | Shepherd | Nov. 12, 1946 |

Certificate of Correction

Patent No. 2,532,667                                                                December 5, 1950

DONALD L. HINGS

It is hereby certified that error appears in the printed specification of the above numbered patent requiring correction as follows:

Column 7, line 9, strike out the word "second" and insert the same in line 10 after "a";

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*